Nov. 30, 1926.　　　　R. R. MOORE　　　　1,608,804
MATERIAL TESTING MACHINE
Filed Oct. 5, 1925
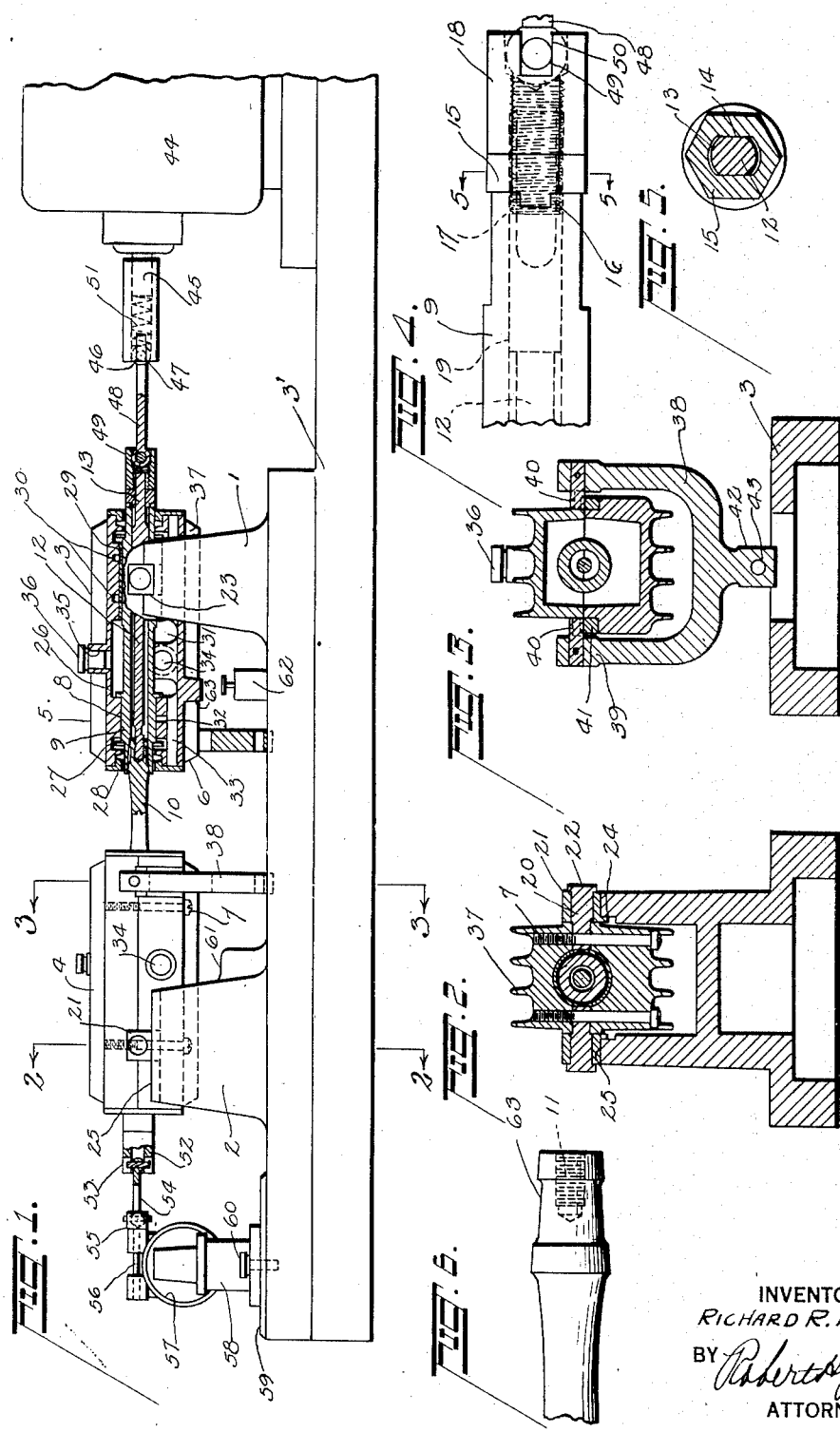
INVENTOR
RICHARD R. MOORE
BY Robert A. Young
ATTORNEY Patented Nov. 30, 1926.

1,608,804

UNITED STATES PATENT OFFICE.

RICHARD R. MOORE, OF DAYTON, OHIO.

MATERIAL-TESTING MACHINE.

Application filed October 5, 1925. Serial No. 60,505.

This invention relates to material testing machines of the kind used in the testing of material specimens for fatigue, where they are subjected to alternating stresses of tension or compression. For this purpose the specimen is subjected to a bending load, and at the same time is power driven so as to be rotated, and the number of rotations may then be used together with the amount of the bending stresses for determining the ability of the material to withstand fatigue.

The primary object of the invention is therefore the provision of a machine which should be capable of accurately determining the fatigue of the material and by means of which the material may be subjected to the stresses desired.

The invention concerns two housings, each of which rotatably supports a journal and the ends of the specimen are attached firmly within a tapered bore in the journals. The housings contain means for applying a bending moment to the specimen and power means is supplied for driving one of the journals so as to cause the rotation of the specimen. The journal housing on the driven side of the machine is supported on a standard which is mounted upon a base plate and this standard is supplied with a pair of opposed notches having vertical slide sides which slidingly support a pair of bearing shoes, so that the bearing shoes are held to prevent endwise movement of the housing but so as to permit the ready upward movement thereof, to enable its removal. These bearing shoes are held rotatably on fulcrum pins which are fixed to the housing and which project outwardly from opposite sides thereof. This arrangement of mounting the housing on the standard is one which permits readily mounting of the specimen in the journal, and which is very effective in reducing vibration chatter and its consequent harmful effects which are likely to produce stress of unknown value on the specimen, in addition to those which are applied by the load.

The journal housing on the tachometer side of the machine or that which is farthest away from the driven journal is supported upon a standard which is mounted upon the base, on horizontal slides, which slidingly mount a plurality of bearing shoes which are held on the fulcrum pins of this housing. Endwise movement of this housing is therefore permitted to take care of slight variations in length of the specimen and possible deformation in length of the specimen under load.

Each of the journal housings form a mounting for a plain bearing within which the journals are mounted for rotation. A slight endwise movement is permitted of the journals within the bearings, so that a practically frictionless endwise movement is permitted to take care of slight changes of length of the specimen and so as no force will be exerted on the specimen except that intended. The ends of the specimens are held within the journals by means of drawing-in bars, which extend through the bores of the journals and thread into the ends of the specimen. These drawing-in bars are tightened and held against the outer end of the journals so that the tapers of the specimen are drawn tightly to the mating tapers in the journals. The tightening means on the ends of the drawing in bars provides a lock between the drawing in bar and the end of the journal to cause their simultaneous rotation, and with this lock in place the tightening nut may be tightened on the drawing in bar to draw the tapers up tightly without causing any bending or stress on the specimen. This tightening nut is provided with a slot within which fits a head on a driving link, the other end of the driving link being provided with a second driving head, which fits in a slot in a driven shaft. The driven shaft is rotated by means of a suitable source of power such as an electric motor, so that the journals will be rotated and the specimen subjected to a stress which is produced by load applying hangers mounted at a known distance from the fulcrum pins.

With the above objects in view therefore and with other objects and advantages which will be more fully set forth in the following description and in the claims, reference is had to the accompanying drawings, in which Fig. 1 is a side elevation partly in section of my invention;

Fig. 2 is a section on the line 2—2 of Fig. 1;

Fig. 3 is a section on the line 3—3 of Fig. 1;

Fig. 4 is a detail of the drawing in bar and tightening nut.

Fig. 5 is a section on the line 5—5 of Fig. 4, and

Fig. 6 is an enlarged view of one end of a specimen.

In the drawings, the pedestals or standards 1 and 2 are mounted upon a fixed base or plate 3¹. Each of these standards support a journal housing as shown at 3 and 4 which are practically identical in construction. Referring particularly to the journal housings, each housing is longtitudinally split in upper and lower halves 5 and 6, attached together by vertically extending through-bolts as shown at 7. Within the housing is mounted a plain bearing 8 which rotatably supports a journal 9. This journal is hollow and the inner end of the journal is adapted to neatly receive the taper on the end of the specimen 10. The specimens are constructed all of the same size and shape, and each specimen has its ends provided with inside threads 11, which are engaged by the drawing in bar 12 which is provided with a threaded end to engage the threads 11. This drawing in bar extends through the hollow journal and at its outer end is provided with threads 13. Part of these threads are cut away so as to provide two flattened opposite sides on the end of the drawing in bar as shown at 14 in Fig. 5, and a setting lock 15 is adapted to slide along the end of the bar freely, being provided with projecting lugs 16 which fit in corresponding slots 17 in the end of the journal 9. When this setting lock is in the position shown in Fig. 4, relative rotation of the spindle and the journal is prevented and the tightening nut 18 may be threaded on the end of the bar 12 so that the mating tapers on the end of the specimen and on the journal will be drawn up tightly and the journal and specimen thus fixed together. The tightening operation of the nut 18 will produce no bending or stress in the specimen by reason of the setting lock 15 holding the specimen to the journal against relative rotational movements.

The device as just mentioned forms a means by which the specimen may be tightened in place and held to the journals, this tightening operation being done at the outer ends of the journal housings and away from the proximity of the specimen. Accidental striking of the specimen is therefore eliminated and the danger of bending the specimen prevented. The specimen has its ends properly tapered the required amount to agree with the taper provided on the inner side of the journal and the middle portion of the taper on the specimen is relieved for a slight undercut as shown at 63, so that a more solid bearing between the journal and the specimen ends may be obtained. The drawing in bar 12 is provided with a bearing surface 19 which neatly fits within the bore of the journal so that the drawing in bar is centered within the journal. Each of the housings is provided with a pair of opposed fulcrum pins 20 which are held in position on the housing by means of the bolts 7, which extend through the inner ends of these pins. Each pin 20 is provided with a cylindrical bearing surface which is mounted within a corresponding bearing surface provided in a fulcrum pin shoe 21, so that free relative rotation is permitted between the pin and the shoe. The shoes are held in place by means of the heads 22 provided on the pins. These heads 22 hold the parts in assembled relation and permit the housing to be removed bodily without danger of the pins or shoes dropping off, and vertical movement within a notch 23 in the top of each side of the standard 1. These notches neatly support the bearing shoes so that endwise movement of the housing is prevented, and chatter and vibration is eliminated. At the same time a free pivotal movement of the housing is permitted on the fulcrum pin and free removal of the housing is permitted to provide for easy assembly and disassembly of the apparatus. The shoes 21 are provided at their inner lower ends with downwardly projecting flanges 24 shown in Fig. 2 which centralize the housing between the two sides of the supporting pedestals. The supporting pedestal 2 is provided with a pair of opposed horizontal slides 25 upon which rest the two corresponding shoes 21 of this housing. Free endwise movement of these shoes is permitted along the top slide of the pedestal 2 to provide for slight variations in length of the specimen or for deformation of the specimen under load. Chatter and vibrational movements of the housings about a vertical axis is presented, however, in an efficient manner by the downwardly projecting flanges 24 which engage on the vertical face on the support as previously mentioned.

The journal 9 is constructed with an internal flange 26 which abuts against the adjacent portion of the bearing 8. This bearing 8 at this portion is a babbitted part of the housing. A collar 27 is firmly attached to the journal 9 as shown and a slight space is provided between the collar 27 and the adjacent portions of the housing, so that the journal 9 is mounted in the housing for slight relative endwise movement. An end plate 28 is secured to the inner end of the housing and if desired may form a packing retainer. At the other end of the journal the latter is supported by means of a babbitted brass bushing 29 which is a push fit within the aluminum housing 3. The journal is lubricated here by oil rings 30 which are of larger size than the journal and dip into the oil reservoir which is located in the space 31 below the journal. The journal itself is preferably of hardened steel, and the inner end of the journal bears on the top thereof due to the manner in which the housing is supported. The oil is supplied to the inner end of the journal from a hole drilled in the middle of the bearing as indicated at 32. This hole taps a longitudinal drain hole 33 in the lower part of the housing 3. The drain hole is supplied with oil as it is located below the level of the oil in the housing and oil is consequently supplied to the inner end of the journal, although the oil level in the housing, as may be seen from a sight glass 34 in the sides of the housing, is below the level of the journal, and oil is consequently prevented from flowing out of the ends of the housing. The hydraulic head of the oil should always be kept below the bottom of the oil outlet hole in the housing end plate. Oil slingers and felt wipers may be provided in the customary manner if desired. The oil may be supplied to the housing through a hole 35 in the top of the housing which is ordinarily closed by the plug 36. Cooling fins as indicated at 37 are provided on the top and bottom of the housing.

Each of the housings is supplied with a load applying casting 38, see Fig. 3. This casting 38 is provided with the two upwardly extending arms 39 which form a firm bifurcation extending around the lower side of the housing. These arms 39 have mounted therein the knife edges 40 and these knife edges are adapted to be placed in the V shaped notches provided in plugs 41 on the sides of the housing. These V shaped grooves are positioned a known distance away from the fulcrum point of the housing, thus giving a known lever arm for the load. The load may be hung upon the casting 38 in any suitable manner, and for this purpose the downwardly extending end of the casting 42 is provided with a hole 43 to which the load may be attached. The stress upon the material of the specimen may thus be calculated since the amount of the load is known and the amount of the weight supplied on the casting 38 may be changed if desired.

The two journals and the specimen are rotated in unison by means of an electric motor 44 which drives a shaft 45. This shaft is provided with a slot 46 which loosely receives a cross pin or head 47 provided on a drive link 48. At its opposite end the link 48 is provided with a second cross pin or head 49 which is loosely received in the cross slot 50 in the end of the nut 18. A spring 51 is provided within a bore in the shaft 45 and presses against the head 47 of the drive link. The drive link may therefore be readily removed by merely pressing the drive link to the right, see Fig. 1, to compress the spring and permit the removal of the head 49 from its slot 50. The drive link thus forms a universal connection between the drive shaft 45 and the spindle and specimen so that no stresses or bending forces are exerted on the specimen other than those exerted by reason of the rotational movements of the shaft 45. The transmission of vibration from the motor is thus prevented.

The rear end of the journal of the housing 4 is provided with a corresponding tightening nut 52, which is slotted to receive the cross head 53 or a drive link 54, the other end of which is provided with a head 55 mounted in a slot on the end of a shaft 56 which drives a tachometer 57. This tachometer is supplied upon a pedestal 58 which is adjustably mounted along a slide 59 on the base 3. Adjustment is permitted and fixed by means of a setting clamp 60. The tachometer may thus be readily moved endwise to disengage it from the spindle within the housing 4. The tachometer forms a counter and gives an indication of the number of times the stress has been alternated on the specimen.

The pedestal 2 is provided with a centrally located projecting lip or shelf 61 on which the housing 4 may fall after the specimen has been broken. Below the housing 3 is a throw out switch 62 which is operated by means of a downwardly projecting lug 63 on the housing 3 when the specimen is broken so that the circuit through the motor 44 will be interrupted automatically by the weight of the housing at the end of the test.

The operation of the machine and the manner in which it is intended to be used will now be understood from the preceding description. The specimen is first applied rigidly in position by inserting its ends in the corresponding ends of the two spindles, the housing 4 being moved to the left for this purpose. The two drawing in bars are tightened in position by drawing up on the tightening nuts, one at a time and the drive links 48 and 54 inserted in position, the first being applied by compressing the spring 51 after the head 47 has been inserted in the slot provided in the end of the shaft 45. The opposite cross bar 49 may then be inserted in place. The tachometer is moved endwise along the base 3′ until it is engaged with the drive link 54. The load is applied by weighting the two hangers or castings 38 equally and the stress on the specimen is computed readily from the amount of the load and the known distance between the application of the load and the fulcrum points. The motor is then set in operation and the number of revolutions of the specimen counted by means of the tachometer or counter 58 until the specimen breaks due to fatigue. When the break occurs the two housings swing about their pivots freely and come to rest on the shelf 61 and the throw out switch 62. This throw out switch disconnects the motor automatically. The swinging movement of the housings about their pivots is permitted by reason of the particular type of loose connection between the motor and the tachometer and the two journal ends. The links merely fall after they are released.

The use of the plain bearing as frictionless support for the rotatable journal is a great improvement over the use of ball bearings or similar frictionless type bearings. In a ball bearing the chatter and vibration entailed is harmful and disadvantageous on the specimen since a stress is produced therein which cannot be calculated. It is very important that the specimen should be subjected to no extraneous stresses other than those which can be accounted for and computed. This freedom from vibration is also a result of the way in which the fulcrum pins of the housings are supported upon a slide block or shoe and the manner in which shoes are mounted, so that the housing adjacent to the driving motor is prevented from moving endwise or from oscillating about a vertical axis by reason of the neat fit between the bearing shoes and the notches in the top of the pedestal support. Vibration is also eliminated in the housing 4 by reason of its mounting upon its bearing shoes and the manner in which these bearing shoes are slidingly mounted on the standard 2, so that the housing 4 is permitted to move endwise, but other movements and vibrations prevented with the exception of the desired movement about the axis of the supporting fulcrum pins. It will be understood that the two housings 3 and 4 and the manner in which the load applying hangers are attached thereto are practically identical with the exception of the mounting provided for the fulcrum pin shoes. The description which has been given in detail for one of the housings will therefore apply equally to the other and it is not considered necessary to again describe the second housing.

I am aware that various changes may be made in the form of my invention which has been chosen for purposes of illustration but I do not intend to be limited to the precise construction which has been herein described in detail.

I claim:

1. A material testing machine comprising a base, a standard on said base, a housing supported on said standard for pivotal movement, a journal in said housing, means for holding a specimen in said journal, load applying means on said housing, a second standard on said base, a second journal housing on said second standard, a second journal in said second journal housing, means for attaching said specimen to said second journal, and means for rotating one of said journals to apply an alternating stress on said specimen.

2. A material testing machine comprising a base, a standard on said base, a journal housing, a pair of fulcrum pins attached to said housing, a bearing shoe mounted for pivotal movement on said fulcrum pins, there being a pair of notches in said standard to neatly hold said bearing shoes, a journal in said housing, means for holding a specimen in said journal, load applying means on said housing, a second journal housing on said base, a second journal in said second journal housing, means for attaching said specimen to said second journal, and means for rotating one of said journals to apply an alternating stress on said specimen.

3. A material testing machine comprising a base, a standard on said base, a journal housing, a journal therein, a pair of fulcrum pins attached to said housing, a bearing shoe mounted for pivotal movement on said fulcrum pins, there being a pair of notches in said standard to neatly hold said bearing shoes, means for holding a specimen in said journal, load applying means on said housing, a second journal housing, a second standard, a pair of fulcrum pins on said second journal housing, a bearing shoe on each of said fulcrum pins, a horizontal slide on said second standard to support the bearing shoes on said second journal housing, a second journal in said second journal housing, means for attaching said specimen to said second journal, and means for rotating said first journal to apply an alternating stress on said specimen.

4. A material testing machine comprising a base, a standard on said base, a journal housing supported on said standard for pivotal movement, a plain bearing in said journal housing, a hollow journal rotatably mounted in said plain bearing, a drawing in bar extending centrally through the journal and cooperating therewith for holding a specimen in said journal, load applying means on said housing, a second journal housing on said base, a plain bearing in said second journal housing, a second journal rotatably mounted within said second bearing, means for attaching said specimen to said second journal and means for rotating one of said journals to apply an alternating stress on said specimen.

5. A material testing machine as set forth in claim 4, said first mentioned journal housing being held against endwise movement on said standard and said second journal housing having free sliding motion in relation to said base.

6. A material testing machine as set forth in claim 2, said journals being hollow and provided with a tapered bore at one end adapted to fit a taper on a specimen.

7. A material testing machine comprising a standard, a journal housing, a pair of fulcrum pins on said housing, a bearing shoe pivotally mounted on each fulcrum pin, there being a pair of notches on said standard in which said shoes are neatly mounted, having vertical faces for guiding said bearing shoes, a hollow journal in said housing having a tapered bore at one end thereof adapted to fit the end of a specimen, a drawing in bar having a threaded end to engage an end of said specimen and passing through said journal, means movable endwise on said drawing in bar, and engaging said journal and a nut threaded on said drawing in bar for firmly attaching said specimen and drawing in bar together, load applying means on said housing, a second journal housing aligned with said first mentioned journal housing, a second journal in said second journal housing, means for attaching said specimen to said second journal, and means for rotating said first journal to apply an alternating stress on said specimen.

8. A material testing machine as set forth in claim 7, said journal housing being longitudinally split, means for attaching the split portions together, and a plain bearing within each journal housing for rotatably supporting said journals therein.

9. A material testing machine as set forth in claim 2, said load applying means comprising a bifurcated hanger having knife edges thereon, there being a pair of V shaped grooves in said journal housing for the reception of said knife edges.

10. A material testing machine as set forth in claim 1 together with a plain bearing in each of said journal housings for rotatably supporting said journals, said journals being permitted free endwise movement in said bearings.

11. A material testing machine as set forth in claim 4, said plain bearing having an oil passage therein extending from the bearing surface to a point below the same and an oil supply in said journal housing above the level of said point.

12. A material testing machine comprising a base, a standard on said base, a housing supported on said standard for pivotal movement, a journal in said housing, means for holding a specimen in said journal, load applying means on said housing, a second journal housing on said base, a second journal in said second journal housing, a driving shaft having a slot in one end, a driving bar having a head loosely fitting in said slot and having a second head for driving said first journal, and a spring within said shaft pressing against said first head whereby said journal is rotated by said shaft through a universal connection without strain upon said journal.

13. A material testing machine comprising a base, a standard on said base, a journal housing supported on said standard for pivotal movement about a horizontal axis, a journal in said housing, means operable at the end of the housing remote from the specimen for holding a specimen in said journal, a load applying hanger on said housing, a second journal housing, a pedestal supported on said base for mounting said second journal housing, a second journal in said housing, a second load applying hanger on said second housing, means for attaching said specimen to said second journal, and operated at the end of the housing remote from the specimen, and means for rotating one of said journals to apply an alternating stress on said specimen.

14. A material testing machine comprising a standard, a journal housing, means for mounting said housing on said standard, and comprising fulcrum pins, bearing shoes therefor and parallel guides for said bearing shoes, the fulcrum pins being provided on one of the parts and the guides on the other to mount the housing on the standard, plain bearing in said housing, a hollow journal mounted therein and having a tapered bore at one end adapted to fit the end of a specimen, a drawing in bar extending thru said journal and having threads at one end for engaging the specimen, means at the end of the drawing in bar remote from the specimen engaging end for connecting the said bar rigidly to the journal, a second journal housing aligned with and adjacent to the first mentioned housing, a second journal therein, a second drawing in bar to connect the second journal to a specimen, means for rotating one of the journals, and load applying means on one of said housings.

In testimony whereof I affix my signature.

RICHARD R. MOORE.